Aug. 19, 1969            G. G. BROWN            3,462,594

PORTABLE LIGHT AND BASE COMBINATION

Filed Sept. 6, 1966            2 Sheets-Sheet 1

INVENTOR
GILBERT G. BROWN
BY
attorney

Aug. 19, 1969  G. G. BROWN  3,462,594
PORTABLE LIGHT AND BASE COMBINATION
Filed Sept. 6, 1966  2 Sheets-Sheet 2
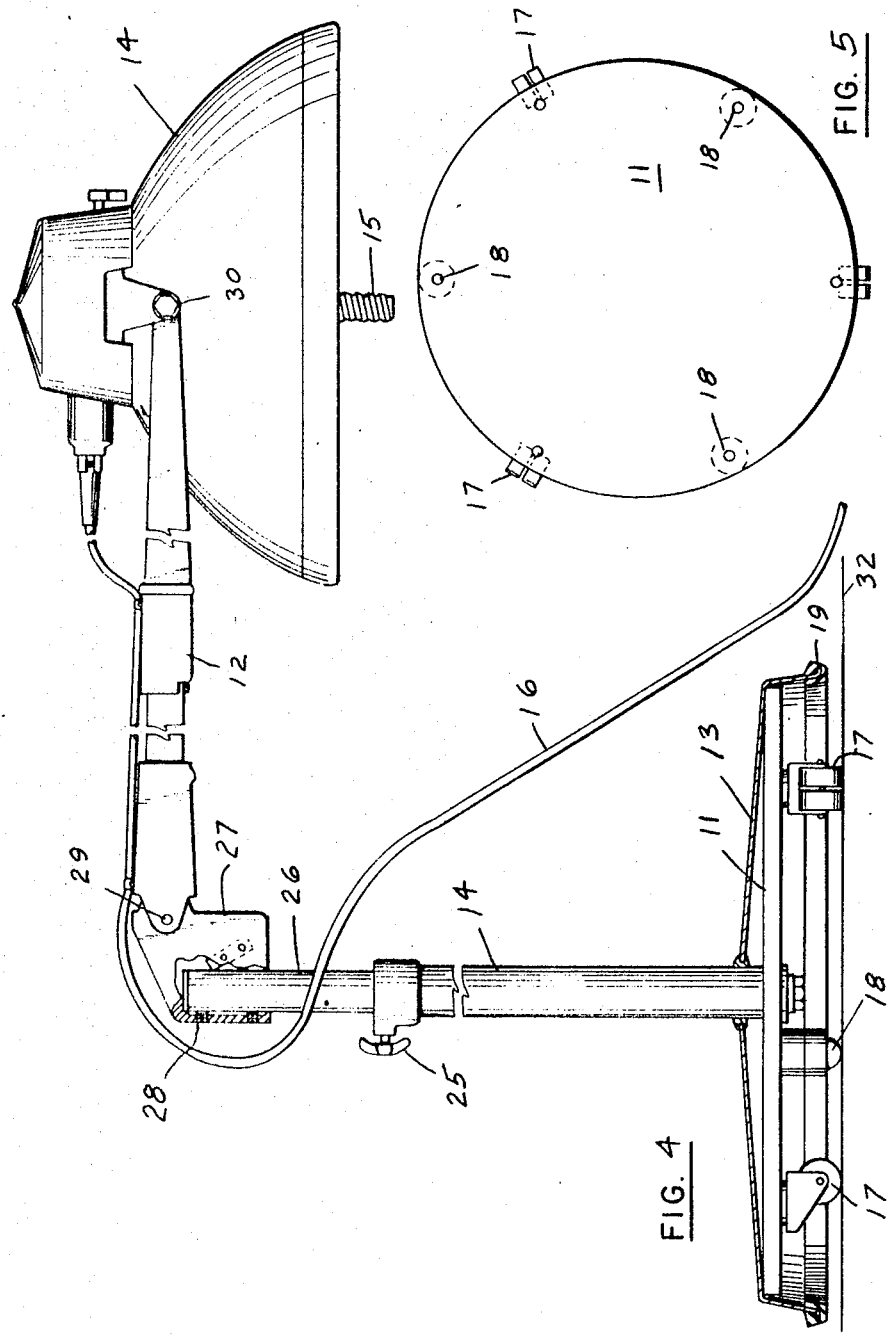
INVENTOR
GILBERT G. BROWN
BY
Charles L. Lovercheck
attorney United States Patent Office 3,462,594
Patented Aug. 19, 1969

3,462,594
PORTABLE LIGHT AND BASE COMBINATION
Gilbert G. Brown, Erie, Pa., assignor to American Sterilizer Company, Erie, Pa., a corporation of Pennsylvania
Filed Sept. 6, 1966, Ser. No. 577,520
Int. Cl. F21s 1/12
U.S. Cl. 240—81             11 Claims

ABSTRACT OF THE DISCLOSURE

A lamp and base therefor, the lamp being supported on an upwardly extending column attached to the base and having a laterally extending arm attached to the lamp. The base has at least three spaced floor-engaging casters attached to it and a roller is spaced from the supporting surface a distance such that it does not touch the supporting surface during normal moving operation. At least one other roller supported on the bottom and located to engage the supporting surface when the lamp base is rocked about a line passing through two of the casters.

This invention relates to pedestals and, more particularly, to pedestals and bases for surgical lights and the like.

Portable surgical lights are sometimes supported on bases provided with casters so that the lights can be moved about a floor in a hospital room or the like. A column often extends upward from the base and the light itself is supported on a laterally extending arm attached to the column so that the light can extend over the top of an operating table or over some other device to be illuminated.

Surgical light bases are frequently supported on a number of casters. For example, they may be supported by as many as eight casters on a round base to provide stability. When moving the light, these casters result in tremendous rolling friction and make it difficult to move the light about the floor. Furthermore, it requires a considerable lateral force on the column of the light in order to move it, thereby resulting in a tendency to upset the light.

In the preferred embodiment, the invention disclosed herein utilizes three casters placed adjacent the periphery of the base at one hundred twenty degree intervals. This in itself would produce an unstable condition. To overcome this, two ball casters are placed at equally spaced intervals between each two casters. These ball casters are mounted a fixed distance above the plane of a floor; for example, ⅛ to 3/32 inch above the floor or some other suitable distance so that they are in contact with the floor only in the event the lamp is pulled off balance. Then the balls contact the floor and tend to cause the lamp to return to the perpendicular. It has been discovered that by providing a base with three or even four casters and providing ball-type casters between the regular casters as set forth above, a lighter, more efficient, and easier to manage lamp results.

The base disclosed herein is extremely portable and easy to move about. It has particular advantage over the ordinary type of base when it is moved ninety degrees to the direction of travel in which it was last pushed. Lights made according to the present state of the art fall short when they are moved in this manner since their casters must swing on their axes ninety degrees. The present invention overcomes this disadvantage because the ball casters facilitate movement of the regular casters.

The base disclosed herein also has utility in supporting large portable fans and other devices supported on bases and which must be moved around and encounter similar problems.

It is, accordingly, an object of the present invention to provide an improved lamp base.

Another object of the invention is to provide an improved lamp base in combination with a pedestal-type surgical lamp.

Still another object of the invention is to provide a lamp and base combination which is simple in construction, economical to manufacture, and extremely light and very readily portable.

A further object of the invention is to provide a lamp and base combination wherein three or four casters are provided on a round base with ball-type casters supported and spaced at equal distances between them.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 4 is a side view partly in cross section of the embodiment of the invention shown in FIG. 1; and FIG. 5 is a top schematic view of the base shown in FIG. 4.

Figure 1:
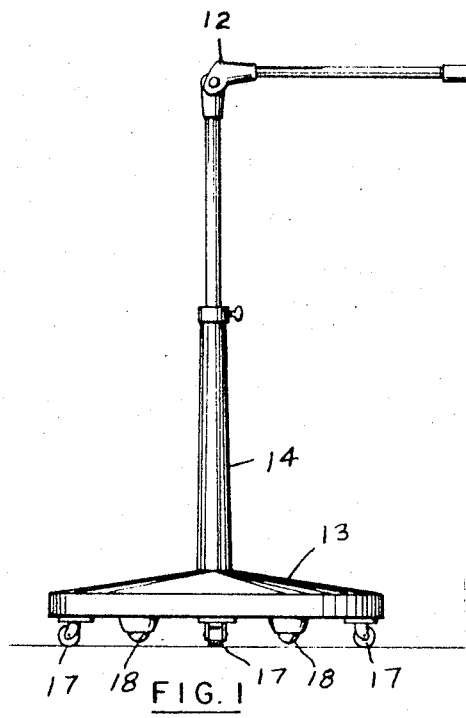
FIG. 1 is a side view of a lamp and base combination according to the invention.

Now with more particular reference to the drawings, the lamp shown is indicated generally at 10. It has a base plate 11 and a base plate cover 12 that may be made of sheet metal and has a bumper 19 around its outer periphery and is sealed to the column 14 as shown. The column 14 is made of two telescoping parts which may be locked in an upwardly extending position by means of the set screw 25 which engages the upper part 26 of the column in the usual manner.

The arm 12 is supported on the column by means of the bracket 27 which is hollow and receives the upper end of the upper part 26 of the column as shown and is held thereby by means of set screws 28. The arm 12 is swingably connected to the bracket 27 by means of pin 29 and the light reflector assembly 14 is supported to the arm 12 by means of the bolt 30. The light has a handle 15 fixed to it for use by an attendant for adjusting the light to suit the individual taste of the physician. The light is supplied power by means of an electrical cord 16.

The base plate 11 has the three double casters 17 attached to it at positions spaced one hundred twenty degrees apart. The single ball type casters 18 are likewise fixed to the base plate 11 and are spaced equidistant from the double caster 17. The single casters 18 are spaced above the floor 32 a distance of at least one-eighth of an inch. The base plate 11 is round as indicated in FIG. 5.

Figure 2:
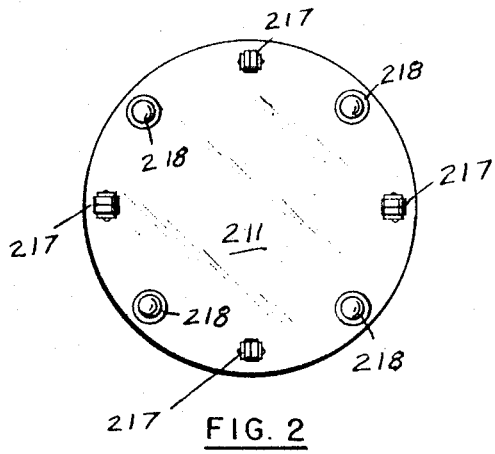
FIG. 2 is a bottom view of another embodiment of the lamp base.

In the embodiment of the invention shown in FIG. 2, the base plate 211 is shown having the double casters 217 spaced at ninety degree intervals and having one of the ball casters 218 fixed to the round base 211 between each two of the double casters.

Figure 3:
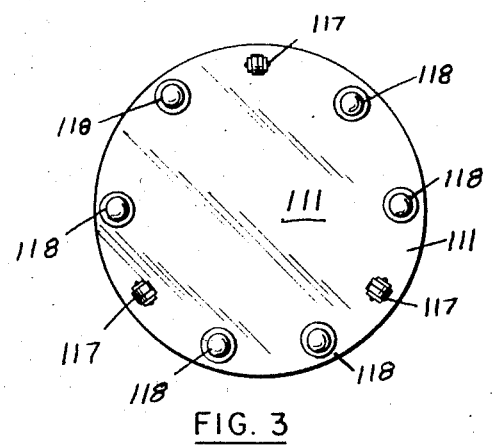
FIG. 3 is a bottom view of another embodiment of the invention.

In the embodiment of the invention shown in FIG. 3, the double casters 117 are supported on the base 111 at positions located one hundred twenty degrees apart and two ball casters 118 are supported between each pair of double casters. The double casters are adapted to engage the floor and the single casters are spaced at least one-eighth inch above the floor during normal use.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a lamp and base therefor,
an upwardly extending column attached to said base,
a laterally extending arm attached to said column,
a lamp defector and light source attached to said arm,
said base having at least three spaced casters attached thereto and adapted to engage a planar supporting surface,
and roller means attached to said base between said casters and extending downwardly from said base and terminating in spaced relation to said planar supporting surfce,
said roller means being spaced from said supporting surface at a distance such that it does not touch said supporting surface during normal moving operation,
at least one of said roller means being adapted to engage said supporting surface when said lamp base is rocked about a line passing through two of said casters,
only three said casters are supported on said base,
and at least two said roller members are disposed between each two adjacent said casters.

2. The combination recited in claim 1 wherein only three said casters are provided,
said base being round,
said three casters being equally spaced from each other on said base,
and one said roller means is provided between each two adjacent said casters and equally spaced therefrom.

3. The combination recited in claim 1 wherein
said roller means comprises spherical members rotatably supported on said base.

4. The combination recited in claim 1 wherein
four said casters are disposed on said base in equal spaced relation to each other,
and a said roller means is disposed between each two adjacent said casters,
said roller means each being disposed midway between two adjacent said casters.

5. The combination recited in claim 1 wherein
said arm extends laterally from said column a substantial distance therefrom,
and a handle is attached to said reflector to adjust the angle of said arm relative to said column.

6. A base for a portable member having a vertically extending column,
said vertically extending column being attached to said base,
at least three first casters attached to said base at spaced positions and second spaced casters attached to said base between said first casters,
said second casters being spaced above a plane passsing through the lowermost part of said first casters whereby said second casters are out of engagement with a floor when said casters are in engagement with said floor and at least one of said casters engages said floor when said column is inclined relative to said floor,
only three said first casters are supported on said base,
and two said second casters are disposed between each two said adjacent said first casters.

7. The base recited in claim 6 wherein
only three said first casters are provided,
said base being round,
said casters being equally spaced on said base,
one said second caster being provided between each two adjacent said first casters and equally spaced therefrom.

8. The base recited in claim 6 wherein
said second caster comprises spherical members rotatably supported on said base.

9. The base recited in claim 6 wherein
four said first casters are disposed on said base in equal spaced relation to each other,
and one of said second casters is disposed between each two adjacent said casters,
said second casters each being disposed midway between two adjacent said casters.

10. The base recited in claim 6 wherein
an arm is attached to said column,
said arm extends laterally from said column to substantial distance therefrom,
a reflector is attached to said arm,
and a handle is attached to said reflector to adjust the angle of said arm relative to said column.

11. The combination recited in claim 1 wherein
said base comprises a base plate made up of a relative rigid plate like member,
said casters being attached to said base plate.

References Cited

UNITED STATES PATENTS

| | | | |
|---|---|---|---|
| 1,303,061 | 5/1919 | Herwig | 240—81 |
| 1,611,903 | 12/1926 | Celb | 240—81 |
| 2,543,926 | 3/1951 | Mounique | 240—81 |
| 2,742,789 | 4/1956 | Seraphin | 248—129 |
| 2,890,891 | 6/1959 | Eurey | 248—129 |

JOHN M. HORAN, Primary Examiner

DAVID B. WEBSTER, Assistant Examiner

U.S. Cl. X.R.
313—63, 230, 231